3,260,751
METHOD OF PREPARING POLYAMINES
Eugene L. Powers and Irvin B. Van Horn, New Martinsville, W. Va., assignors to Mobay Chemical Company, Pittsburgh, Pa., a corporation of Delaware
No Drawing. Filed June 13, 1963, Ser. No. 287,522
6 Claims. (Cl. 260—570)

This invention relates to polyamines and, more particularly, to a method for the preparation of polyamines which are suitable for the preparation of organic polyisocyanates.

The condensation of aniline with formaldehyde in acid solution in a batch reactor is well known. Aniline can react with formaldehyde in either of two ways. The aniline may add a methylene group to the primary amino group; or the methylene group may replace a hydrogen on the benzene ring of aniline to form a methylene bridge. Approximately equimolar amounts of aniline and formaldehyde give high molecular weight polymers. As the amount of aniline is increased in relationship to the formaldehyde, the more conventional polyamines, such as, diamino diphenyl methane, are obtained. It is known also to substitute other amines and aldehydes, or even ketones, into the reaction process in order to prepare various polyaryl alkylene polyamines. In a batch reactor it is impossible to keep the mol ratio of aniline to $CH_2O$ constant because part of one has to be added gradually to all of the other. Thus, the molecular weight distribution of the product which results is often adversely affected. Moreover, in the production by a batch technique of diamino diphenyl methane and similar compounds, the position of substitution is often random or, in other words, it may be in positions ortho and, to a small extent, meta to the primary amino group, as well as being in the para position. In the batch reactor the initially formed diamine remains present under conditions where it can react with further aniline and $CH_2O$ to prepare higher polyamines. The percentage of the initial reactants which are converted to relatively low molecular weight useful products is, therefore, sometimes unsatisfactory.

It is, therefore, an object of this invention to provide an improved process for the preparation of polyaryl alkylene polyamines which contain more useful products. Another object of the invention is to provide a method of preparing polyaryl alkylene polyamines which avoids the production of undesirable high polymers. Another object of this invention is to provide a method of making diamino diphenyl methane in a higher yield. Still another object of this invention is to provide a method of controlling the site of bridging of an aryl amine nucleus by an aldehyde or ketone in a typical condensation reaction. A further object of this invention is to provide an improved method of condensing aniline with formaldehyde to obtain higher yields under comparable conditions of desirable products. Still another object of this invention is to provide for the preparation of polyamines based on aniline and formaldehyde by a continuous process.

The foregoing objects and others which will become apparent from the following description are accomplished in accordance with this invention, generally speaking, by providing a method of condensing an aryl amine having one benzene nucleus with an aldehyde or ketone which contains less than 7 carbon atoms by continuously introducing at least one mol of said amine per mol of aldehyde or ketone into a reaction zone under conditions which cause turbulent flow at a Reynolds number of from about 4500 to about 100,000 in the presence of a catalyst for the condensation of said amine with said aldehyde or ketone. Thus, this invention contemplates the condensation of aryl amines, and preferably aniline, with aldehydes or ketones, and preferably formaldehyde, in the presence of a catalytic amount of a strong Lewis acid, by mixing at least one mol of the amine per mol of the aldehyde or ketone component under conditions which cause turbulent flow at a Reynolds number of from about 4500 to about 100,000, and preferably from about 10,000 to about 100,000. Turbulence in this range is essential to the process of the invention in order to mix the components and maintain the required relative concentration of components to produce the desired polyamines and avoid high molecular weight polymers. Moreover, it is essential to have a catalyst for the condensation present or, in other words, a catalyst which promotes the reaction of the aldehyde or ketone with a hydrogen atom on the benzene ring of the aryl amine.

Any suitable aryl amine having one benzene nucleus and at least one replaceable hydrogen atom is contemplated. It is preferred that the benzene nucleus be substituted by not more than one radical or other substituent, such as, chlorine, bromine, nitro, and the like, and that it have one or two free primary amino groups. When the benzene nucleus is substituted by a radical, it is preferably a lower alkyl radical, such as, methyl, ethyl, propyl, and the like. Aniline is the preferred amine. However, other amines are within the scope of the invention including, for example, chloroaniline, ortho, meta, and para-toluidine, ortho, meta, and para-phenetidine, ortho, meta, and para-anisidine, ortho, meta, and para-xylidine, ortho, meta, and para-xenyl amines, nitroaniline, 2,4-tolylene diamine, 2,6-tolylene diamine, and the like.

Any suitable aldehyde or ketone may be used provided that it has less than 7 carbon atoms including, for example, formaldehyde, acetaldehyde, propionaldehyde, butyraldehyde, benzaldehyde, cyclohexanealdehyde, acetone, methyl ethyl ketone, methyl-N-propyl ketone, diethyl ketone, hexanone-2, hexanone-3, di-n-propyl ketone, cyclohexanone, and the like. It is preferred that the aldehyde or ketone have the formula RCOR wherein R is hydrogen or alkyl, the sum of the carbon atoms being, at most, 6.

Any suitable catalyst for the condensation of said amine with said aldehyde may be used, but it is preferred to use a strong Lewis acid including, for example, hydrochloric acid, sulfuric acid, perchloric acid, hydrobromic acid, borontrifluoride, tin tetrachloride, phosphorous trichloride, phosphorous trichloride, phosphorous oxychloride, thionyl chloride, aluminum trichloride, iodine, bromine, benzoyl chloride, phthalyl chloride, benzyl chloride, and the like.

As set forth above, it is an essential feature of this invention that the reaction be carried out under conditions which will cause turbulent flow at a Reynolds number of from about 4500 to about 100,000, and preferably in the range of about 10,000 to 100,000. Any suitable method of carrying out mixing which will give this Reynolds number is satisfactory. If the Reynolds number is allowed to fall below about 4500, there is often a plugging of the equipment and, moreover, the mixing is insufficient to yield a satisfactory product because the ratio of components varies and/or the components separate into two phases. A satisfactory mixing device for obtaining the turbulence required in the method of this invention can be of simple construction. For example, a ¼-inch pipe may be used to form an L with another ¼-inch pipe, and at the base of the L, an additional pipe may be coupled to provide for injection of one component into the other. In such equipment, the pipe in the base of the L may be of, for example, ¼-inch outside diameter stainless steel tubing, which is inserted into the ¼-inch iron pipe with a coupling which permits the injection end of the pipe to pass the injection point of the L so that when amine salt is injected through the L position, an aqueous solution of aldehyde or ketone may be injected through the stainless steel tubing, and particularly through a ⅟₃₂-inch hole in the end of the stainless steel tubing to produce very high turbulence in the mixing zone. Of course, the pipes may be jacketed for either cooling or heating of the reaction mixture, and suitable valves may be provided so that the turbulent reaction mixture is continuously drawn off to a tower for primary digestion of the acid salt followed by a mixer for neutralization of the acid salt and then separation of the resulting product. It may be desirable in some cases to separate the addition of one component and the other and use various injection nozzles along the pipe reactor; or various points of introduction without nozzles may be provided, so long as turbulent flow is created throughout at least a portion of the continuous reaction zone.

The initial product from the turbulent zone is preferably digested in a separate digestion zone. Any suitable method for carrying out the digestion of the initial reaction product to achieve complete reaction and the ensuing separation of the organic and inorganic layer may be used. The digestion step is dependent on time, temperature, and catalyst concentration. If one is willing to suffer the disadvantage of extended reaction times, then low temperatures may be employed, from, e.g., room temperature to, for example, 75° C. Temperatures above 75° C. are preferred, however, in the interest of shortening the digestion period. Digestion is preferably accomplished in two stages and is continued in any case until digestion is substantially complete. The two-stage process preferably takes place in an initial stage at 50° to 90° C. and, in a second stage, at a temperature between about 90° C. to about 150° C. In this event, total digestion times will be less than about six hours. The material from the digestion step is then placed in another vessel which has caustic in it in an amount sufficient to react with hydrochloric acid initially used, and preferably in a stoichiometric amount. The material is thus neutralized at about 75° to about 100° C., preferably 90° C., for optimum separation of the organic and inorganic layer. It helps in the neutralization step to agitate the product. The desired organic layer is drained from the bottom of the reaction mixture, and the amine product is put into a distillation apparatus where excess aniline and water are distilled off. The crude mixture of amines may then be filtered to remove any residual salt. Of course, it is also possible to distill out the various lower isomers, but separation of the higher polymers from each other is very difficult. It is preferred in accordance with the invention to use the initial product containing both diamines and higher polyamines for further reaction with phosgene to prepare a mixture of organic polyisocyanates.

The ratio of amine to aldehyde or ketone in the reaction process is important. In order to avoid high polymers, it is necessary to have more than one mol of amine per mol of aldehyde, and it is preferred that the molar ratio of amine to aldehyde be within the range of from about 1.4:1 to about 4:1. Stated in other words, and with particular reference to the preferred aniline-formaldehyde reaction, one should preferably not have less than a 30% molar deficiency of aniline, and there is no real advantage to having more than a 100% molar excess of aniline. A preferred aniline to formaldehyde ratio is from about 1.6 mols of aniline per mol of formaldehyde to about 3.2 mols of aniline per mol of formaldehyde. While excesses above 100% may be used, they are uneconomical and anything above 300% molar excess is very uneconomical because of the problem of separating the excess amine from the desired product. When molar deficiencies or molar excesses are referred to, it is understood that an equivalent amount herein is two mols of aniline or other monoaryl amine per mol of formaldehyde or other aldehyde or ketone, since two mols of aniline will theoretically react with one mol of formaldehyde to yield one mol of diamino diphenyl methane or the like.

It is desirable to control the weight ratio of aniline to water. A satisfactory aniline to water ratio is from about 0.2:1 to about 30:1 and it is preferred to hold the ratio within the range of from about 0.5:1 to about 6:1. Below about 0.2:1, a lot of aniline becomes dissolved in the water and is lost. Furthermore, a problem of separation exists since aniline is just slightly heavier than water and, thus, with large excesses of water, the brine formed in the neutralization step is more likely to have the same specific gravity as aniline. When the specific gravities are the same or nearly the same, the separation becomes difficult. Ratios above about 30 parts of aniline per part of water make handling of the aniline impractical.

For some products, it is desirable to make a crude reaction product of amines which has from about 40% to about 95% diamine. By suitable adjustment of the ratios of components and the amount of water, it is possible to produce any desired ratio of diamine to higher polyamines.

The reaction may be carried out at any suitable temperature. It is preferred to have the reactants warm enough so they will flow easily, but below the boiling point at the operating pressure. It is to be pointed out that the reaction may be carried out under pressure. At low pressures, it is preferred to add the aldehyde or ketone and preferably formaldehyde at ambient temperatures and the aqueous solution of aniline mixed with aniline hydrochloride or other salt at a temperature of about 45° C. to about 65° C. The reaction is exothermic and the reactants will continue to react and exotherm as they proceed through the continuous mixing device. In some cases, therefore, it may be necessary to cool the reaction mixture, but in most cases, the reactants can be allowed to exotherm without cooling.

The products of the invention are useful for the preparation of organic polyisocyanates or they may be used for the preparation of epoxy resins in accordance with well-known processes. The organic polyisocyanates can, in turn, be used for the preparation of polyurethane plastics which are useful as elastomers, foams for insulation, coatings, adhesives, and the like.

The invention is further illustrated by the following examples in which parts are by weight unless otherwise specified.

In the examples given below in Table 1, aniline is first reacted with an HCl solution, the proportion of aniline indicated being the percentage of the amount necessary to react with the amount of formaldehyde used. In other words, where −10% is indicated in the table, a 10% molar deficiency of aniline was used per mol of a 37% aqueous solution of formaldehyde, based on two mols of aniline per mol of formaldehyde. An aqueous solution of hydrochloric acid is employed for the reaction so that the molar ratio of aniline to hydrochloride is 1. The resulting aniline hydrochloride is introduced into a reaction zone at the said rate indicated in a ¼-inch pipe which has a stainless steel injection nozzle just past the entry point for the aniline hydrochloride and a 37% aqueous solution of formaldehyde is introduced through the stainless steel injection nozzle so that turbulent flow at the Renyolds number indicated in the table is obtained. The reaction mixture is maintained at the condensation temperature indicated in the table. The continuous flow of reaction mixture from the pipe reactor is collected and further reacted at the digestion temperature indicated in the table for the time indicated in the table and then neutralized with a 50% aqueous solution of sodium hydroxide. The yield per cent indicated is for diamino diphenyl methanes.

Table 1

| | | | | | |
|---|---|---|---|---|---|
| Excess Aniline, percent | −10 | −16.5 | +7 | +7 | +40 |
| HCl Concentration, percent | 23 | 13.5 | 23.8 | 13.5 | 23 |
| Aniline feed rate, mol/min | 19.9 | 4.1 | 5.6 | 4.2 | 21.4 |
| Condensation temperature, °C | 65 | 50 | 86 | 50 | 50 |
| Digestion temperature, °C | 100 | 90 | 90 | 90 | 100 |
| Digestion time, hours | 3 | 1 | 1 | 1 | 3 |
| Yield, percent | 60.2 | 64.2 | 75.5 | 80.1 | 85.0 |
| Reynolds Number | 16,500 | 5,300 | 5,000 | 5,200 | 16,850 |

When an excess of 50% of aniline is used at comparable condensation and digestion temperatures and times, a yield of only 78% is obtained by the old batch technique.

It is to be understood that the foregoing examples are given for the purpose of illustration and any other suitable amine, aldehyde or ketone catalyst or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of preparing polyamines which comprises mixing continuously under turbulent flow conditions at a Reynolds number of from about 4500 to about 100,000, an amine which is aniline, chloroaniline, ortho-, meta- and paratoluidine, ortho-, meta- and para-phenetidine, ortho-, meta- and para-anisdine, ortho-, meta- and para-xylidine, ortho-, meta- and para-xenyl amines, nitroaniline 2,4-tolylene diamine or 2,6-tolylene with an aldehyde or ketone which is formaldehyde, acetaldehyde, propionaldehyde, butyraldehyde, benzaldehyde, cyclohexanealdehyde, acetone, methyl ethyl ketone, methyl-n-propyl ketone, diethyl ketone, hexanone-2, hexanone-3, di-n-propyl ketone or cyclohexanone, the reactants being continuously present in the reaction zone in proportions of from about 1.4 to about 4 mols of amine per mole of aldehyde or ketone, said reaction being carried out in the presence of an acid catalyst for the condensation of said amine with said aldehyde or ketone.

2. The method of claim 1 wherein said Reynolds number is within the range of from about 10,000 to about 100,000.

3. The method of claim 1 wherein said condensation reaction is carried out in an aqueous solution and the weight ratio of amine to water is within the range of 0.2:1 to about 30:1.

4. The method of claim 1 wherein said catalysts is a Lewis acid.

5. The method of claim 1 wherein said reaction is carried out at a temperature of from about 65° C. to about 150° C.

6. A method of preparing polyamines which comprises mixing continuously under turbulent flow conditions at a Reynolds number of from about 4500 to about 100,000 aniline with formaldehyde, said aniline and formaldehyde being continuously present in the reaction zone in proportions of from about 1.4 to about 4 mols of aniline per mol of formaldehyde, said reaction being carried out in the presence of an acid catalyst for the condensation of aniline with formaldehyde to prepare a polyamine.

References Cited by the Examiner

UNITED STATES PATENTS

| | | | |
|---|---|---|---|
| 1,803,331 | 5/1931 | Kladiviko | 260—570 |
| 1,915,108 | 6/1933 | Horst | 260—570 |
| 1,954,484 | 4/1934 | Mattison | 260—570 |
| 2,683,730 | 7/1954 | Seeger et al. | 260—570 |
| 2,818,433 | 12/1957 | Erickson | 260—570 |
| 2,822,373 | 2/1958 | Beck | 260—453 |
| 2,938,054 | 5/1960 | Demers et al. | 260—570 |
| 2,974,168 | 3/1961 | Sharp et al. | 260—570 |
| 3,097,191 | 7/1963 | France et al. | |
| 3,163,666 | 12/1964 | Kirss et al. | 260—570 X |

CHARLES B. PARKER, *Primary Examiner.*

ROBERT V. HINES, *Assistant Examiner.*